United States Patent [19]

Jessop

[11] 4,121,195
[45] Oct. 17, 1978

[54] ERROR DETECTION IN DIGITAL SYSTEMS
[75] Inventor: Anthony Jessop, Harlow, England
[73] Assignee: International Standard Electric Corporation, New York, N.Y.
[21] Appl. No.: 798,504
[22] Filed: May 19, 1977
[30] Foreign Application Priority Data
  Jun. 2, 1976 [GB] United Kingdom ............... 22849/76
[51] Int. Cl.² ...................... G06F 11/10; G08C 25/00
[52] U.S. Cl. ............................. 340/146.1 AB; 325/41
[58] Field of Search ........... 340/146.1 AB, 146.1 AG; 178/69 D; 325/41, 38 A

[56] References Cited
U.S. PATENT DOCUMENTS

| 3,405,235 | 10/1968 | Carter | 340/146.1 AB |
| 3,439,330 | 4/1969 | Sipress et al. | 340/146.1 AB |
| 3,611,141 | 10/1971 | Waters | 340/146.1 AB |
| 3,646,517 | 2/1972 | Waters | 340/146.1 AB |
| 3,810,111 | 5/1974 | Patel | 340/146.1 AB |
| 3,825,892 | 7/1974 | Catchpole | 340/146.1 AB |
| 3,842,401 | 10/1974 | Smith, Jr. et al. | 340/146.1 AB |

Primary Examiner—Charles E. Atkinson
Attorney, Agent, or Firm—John T. O'Halloran; Alfred C. Hill

[57] ABSTRACT

This invention relates to error detecting arrangements for digital transmission systems. It is particularly applicable to systems in which the line signals are already arranged in or can be converted into a format resulting in what may be termed constant accumulated disparity signals. In a digital transmission system parity information is included so as to cause a toggle in a repeater to take up a particular state immediately following each parity check. This state will only change when an error occurs, or an odd number of errors. When an error has occurred and the toggle has changed its state the new state becomes the normal state and a further change indicates a further error. No special line code is needed and circuitry in the repeater is kept to a minimum. For a binary system it requires an extra digit to be added at reasonable intervals, e.g. after every 100 bits.

4 Claims, 2 Drawing Figures

ERROR DETECTION IN DIGITAL SYSTEMS

BACKGROUND OF THE INVENTION

This invention relates to error detecting arrangements for digital transmission systems. It is particularly applicable to systems in which the line signals are already arranged in or can be converted into a format resulting in what may be termed constant accumulated disparity signals.

The term "constant accumulated disparity" is used to mean that over a given period of time (of sufficient duration) the ratio of digits of different values is such that the signals have a substantially constant d.c. content, which may be zero in some cases. One way of achieving zero accumulated disparity signals is to have normal binary coded p.c.m. signals random scrambled at a transmitter and descrambled at the receiver. Truly randomized signals have no d.c. content. Pseudo-randomized signals can be made to have, for all practical purposes, a negligible d.c. content. The same is true of scrambled binary coded signals which are subsequently translated into ternary coded signals.

According to the invention there is provided an error detecting arrangement for a digital transmission line system over which constant accumulated disparity signals are transmitted including at a transmitter means for modifying the line signals at intervals to introduce into the line signals control signals the digital values of which reflect the parity of predetermined digital signal events in the immediately preceding intervals, the control signals themselves having values which maintain the overall constant accumulated disparity of the transmitted signals, means at a subsequent point in the system for counting the predetermined digital signal events in the transmitted signals and means for determining a change in the d.c. content of the counting means output.

In one embodiment of the invention the modifying means comprises means for inserting additional parity check digits into the line signals.

In another embodiment of the invention where the line signals are in the form of digit code groups the modifying means comprises means for modifying or replacing selected code groups to provide different code groups, to indicate predetermined parity conditions.

Embodiments of the invention will now be described with reference to the accompanying drawings, in which:

DESCRIPTION OF THE PREFERRED EMBODIMENT

Figure 1:
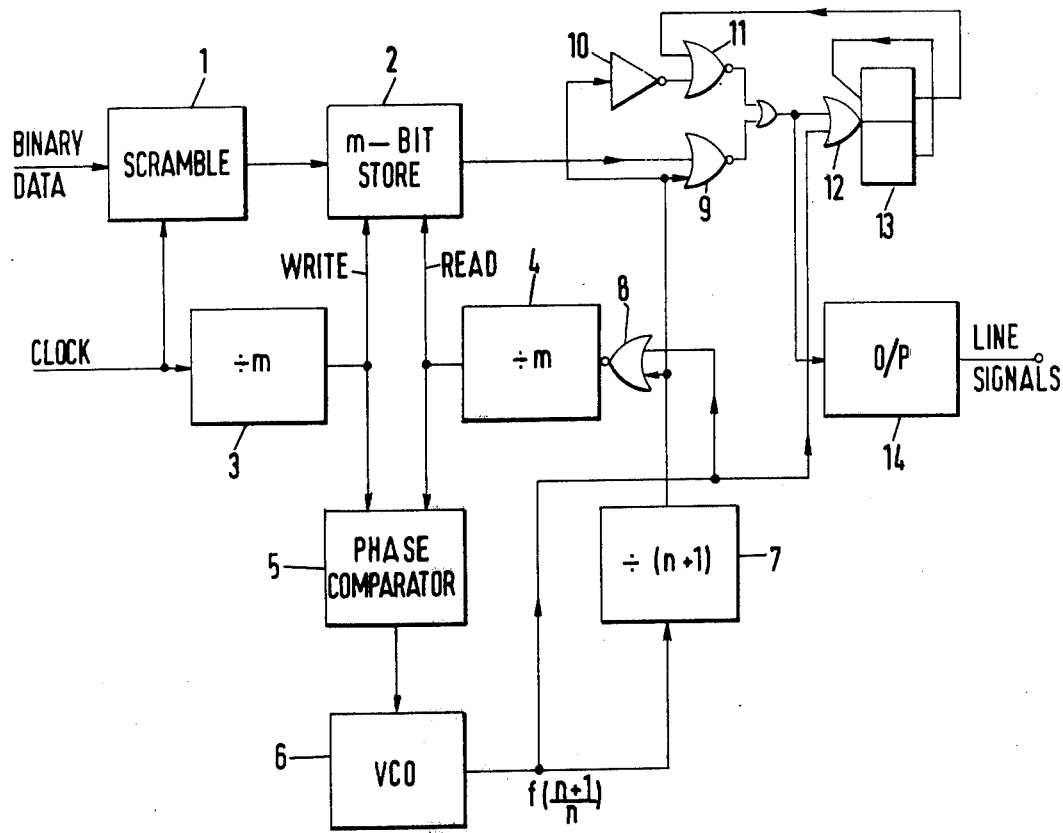
FIG. 1 illustrates in block diagram a means for modifying binary coded digital signals according to the invention.

In the arrangement shown in FIG. 1 binary coded data signals are fed to a scrambler circuit 1 which is driven by an input clock having a frequency $f$. The output of the scrambler circuit is a pseudo-randomized binary signal having, for all practical purposes, a zero accumulated disparity. That is, the d.c. content of the binary signals is substantially nil, although for any given period of time there may be an excess of MARKS (or SPACES) but in a subsequent period this excess will be redressed by a counter-balancing excess of SPACES (or MARKS). The input clock is also fed to a dividing counter circuit 3, where the frequency $f$ is divided by $m$, which for example is 4. The output of counter 3 is termed the "write" clock and is used to write the scrambled binary signals into an $m$ (i.e. 4) bit store 2. A voltage controlled oscillator (VCO)6 is arranged to run at a frequency of $f(n+1/n)$ where $n$ is the number of digits occurring between parity checks. Thus if $n = 100$, every $101^{th}$ digit in the transmitted line signals will be a parity digit. It will be appreciated that the higher the value of $n$ the lower the detectable error rate becomes. The output of the VCO is fed via NAND gate 8 to a "read" clock counter 4 which also divides its input by $m$. The read clock is used to read out the contents of the store 2, which is effected at a slightly higher rate than the writing operations. The output of the VCO is also fed to a divide-by-$(n+1)$ circuit 7, the output of which is used to inhibit the input of the VCO to counter 4 via gate 8. Thus the mean input frequency to counter 4 is $f$. Both the outputs of counters 3 and 4 are also fed to a phase comparator 5 the output of which is used as a control signal for the VCO 6.

As a result of the slightly different write and read clock rates the output of store 2 is 100 digits in approximately 99 digit time slots with respect to the scrambled input data. In the $101^{th}$ time slot nothing is read out because the $101^{th}$ read clock pulse is inhibited by the output from circuit 7. During normal reading from store 2 the read out digits are passed via gate 9 to the transmitter output stage 14 and to toggle 13 via gate 12. Gate 12 also receives the VCO output and thus 13 acts as a single stage parity counter for binary digits of one particular value. After 100 digits have been read from the store 2 gate 9 is disabled by the output of circuit 7 and gate 11 is enabled, the output of circuit 7 being passed through inverter 10 for this purpose. The condition of toggle 13 during the $101^{th}$ digit time slot is then passed through gate 11 to the output circuit 14 and forms the parity check bit.

Figure 2:
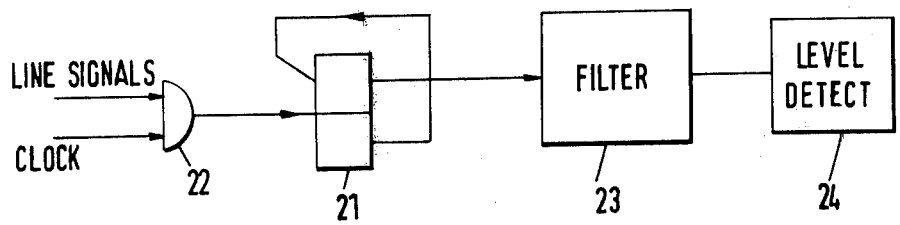
FIG. 2 illustrates a means for counting the predetermined signals events and determining a change in the d.c. content of the counted signals.

At a subsequent point in the system, e.g. in a repeater, the received line signals are fed to a toggle 21 (FIG. 2) via 22, which also receives a clock at the received line digit rate. The output of the toggle 21 is fed via a filter 23 to a level detector 24. In its simplest form filter 23 is a low pass filter and detector 24 is a voltage comparator with a reference level set mid-way between the ONE (or HIGH) and ZERO (or LOW) logic levels. However, this method imposes d.c. wander problems and an alternative method is to make filter 23 a bandpass filter with a characteristic such that changes in d.c. level produce alternate positive and negative pulses with respect to an a.c. coupled mean voltage level. Assuming there are no errors in the received line signals the output of toggle 21 will be a steady state d.c. signal after each parity digit is received. If, however, a single error, or an odd number of errors, occurs in the received line digits the output of the toggle will change after the next parity check digit is received. Similarly, if the data digits are correct but the parity check digit is wrong, the output of the toggle will change. In this way each single error, or odd number of errors, causes a change in the d.c. level in the toggle output.

Provided that the input data is suitably pseudo-randomized this d.c. level change caused by errors is distinguishable at the output of the filter 23. Once one error has occurred and the toggle has reversed its state when the parity check digit has been received the toggle will continue to respond but in a reversed mode for all subsequently received correct digits. Thus the changed d.c. level after one error will now become the new steady state d.c. signal. If a subsequent error occurs then there will be a further change in the d.c. level in the opposite direction. The advantage of this is that no framing information is required, no specific line coding is required and the amount of circuitry required in a repeater is kept to a minimum. At the receiver end of the system the added parity bit can be removed by a process which is the inverse of that used to introduce it at the transmitter, i.e. by using an elastic store arrangement with different write and read clocks.

The foregoing assumes that successive parity check digits have the same value so long as no error occurs. If the value of the parity check digit is arranged to alternate every 100 digits, for example, then instead of looking for a change in the d.c. content of the toggle output an error is indicated by a phase reversal in the alternating output of the toggle.

Reference has been made to the case where binary coded signals are scrambled and then translated into ternary code groups. The object of doing this is that certain binary groups of digits can be translated into either or two alternative code groups of opposite disparity, the choice being determined by the accumulated disparity of the preceding signals. Such a system has been described in British Patent Specification No. 1,156,279. When applying the present invention to such a system it is not always necessary to introduce an extra parity check digit or group of digits. If, for example, a particular group of four binary digits can be translated into ternary groups of either +00 or −00 the possibility exists to make a third translation choice of 000. Then the ternary groups can be used as a parity check group as follows:

| | |
|---|---|
| +00 } Even (or Odd) Parity | |
| −00 | |
| 000 | Odd (or Even) Parity |

Such translations are easily accomplished if the translation from binary to ternary is achieved using a ROM (Read Only Memory) since all that is required is a slight modification to the ROM program. In the repeater the counter is required to count signal events, that is it counts positive and negative MARKS equally as opposed to zero polarity SPACES. However spaces could be counted as opposed to marks. At the receiver the retranslation is carried out in the normal manner, the three alternative ternary groups all being translated into the same binary group.

In practice it may be advisable to utilize a transmission line code in which groups of six binary digits have been translated into groups of four ternary digits. The invention is still applicable to such line codes.

I claim:

1. An error detecting arrangement for a digital transmission line system over which constant accumulated disparity signals are transmitted comprising:
 a transmitter including
  first means for modifying the line signals at intervals to introduce into the line signals control signals the digital values of which reflect the parity of predetermined digital signal events in the immediately preceding intervals, said control signals themselves having values which maintain the overall constant accumulated disparity of transmitted signals; and
 a subsequent point in the system including
  second means coupled to said first means, said second means responding to said predetermined digital signal events in said transmitted signals, and
  third means coupled to said second means, said third means determining a change in the d.c. content of the output of said second means.

2. An arrangement according to claim 1, wherein said constant accumulated disparity signals are binary coded data signals,
 said first means including
  a scrambler to form from said binary coded data signal coupled thereto a pseudo-randomized binary signal of frequency $f$ having substantially zero accumulated disparity,
  an m-bit store coupled to said scrambler to receive said pseudo-randomized binary signal, where $m$ is an integer greater than one,
  fourth means coupled to said store to extract the stored signals at a frequency $f(n+1/n)$, where $n$ is an integer greater than one but different than $m$ and $n$ is the number of digits occurring between parity checks, and
  fifth means coupled to said store and said fourth means, said fifth means inserting into every $(n+1)$ the digit position in the extracted signal a parity check digit.

3. An arrangement according to claim 2, wherein said second means includes
  a clocked bistable device coupled to said fourth means to receive said extracted signal containing said parity check digit, the clock being at the frequency of said extracted signal, and
 said third means includes
  a low pass filter coupled to said bistable device, and
  a level detector coupled to the output of said low pass filter.

4. An arrangement according to claim 2, wherein said second means includes
  a clocked bistable device coupled to said fourth means to receive said extracted signal containing said parity check digit, the clock being at the frequency of said extracted signal, and
 said third means includes
  a band-pass filter coupled to said bistable device, said filter having a characteristic such that changes in the d.c. level of the input to said filter produce alternate positive and negative pulses with respect to an a.c. coupled mean voltage level.

* * * * *